United States Patent [19]
Boon

[11] 3,807,807
[45] Apr. 30, 1974

[54] FEEDING DEVICE FOR BULK MATERIAL TO A PNEUMATIC CONVEYING SYSTEM

[75] Inventor: Bruce T. E. Boon, Wayne, N.J.

[73] Assignee: Eastern Cyclone Industries, Inc., Fairfield, N.J.

[22] Filed: May 10, 1971

[21] Appl. No.: 141,750

[52] U.S. Cl................. 302/42, 302/52, 222/56, 222/503
[51] Int. Cl.............................................. B65g 53/40
[58] Field of Search.......... 222/56, 64, 503; 302/34, 302/42, 52, 53, 27

[56] References Cited
UNITED STATES PATENTS

| | | | |
|---|---|---|---|
| 1,852,535 | 4/1932 | Moore | 302/27 |
| 2,661,875 | 12/1953 | Murray | 222/503 |
| 2,674,338 | 4/1954 | Lindsay et al. | 222/64 X |
| 1,062,352 | 5/1913 | Middleton | 302/27 |
| 3,061,872 | 11/1962 | Holly | 222/503 X |
| 2,011,133 | 8/1935 | Yoss | 302/52 |
| 3,186,596 | 6/1965 | Badgett | 222/14 |
| 1,583,031 | 5/1926 | Titus | 222/503 |
| 2,240,350 | 4/1941 | Ross | 222/503 |
| 2,209,115 | 7/1940 | Fitzgerald | 222/503 |
| 3,217,927 | 11/1965 | Bale et al. | 222/56 |
| 3,450,438 | 6/1969 | Moller | 302/21 |

*Primary Examiner*—Evon C. Blunk
*Assistant Examiner*—W. Scott Carson
*Attorney, Agent, or Firm*—William O. Heilman; Heilman, William O.; Anthony J. Casella

[57] ABSTRACT

Improved method of feeding bulk material of various sizes and shapes at predetermined times or intervals to a pneumatic conveying system. One of the features is the use of doors of curved configuration which open and close through a repeating, measured cycle to allow a large volume of mixed bulk material contained in a relatively large storage hopper or reservoir to be fed into a pneumatic conveying tube of smaller cross sectional area without clogging up either the entrance to the pneumatic tube or the pneumatic tube itself.

20 Claims, 4 Drawing Figures

PATENTED APR 30 1974  3,807,807

INVENTOR
BRUCE T. E. BOON
BY
James M. Heilman
ATTORNEY.

FEEDING DEVICE FOR BULK MATERIAL TO A PNEUMATIC CONVEYING SYSTEM

It is well known in the art to use pneumatic conveying systems for the conveyance or transportation of a wide range of products and materials. In order to secure efficiency of operation in a pneumatic system, the feed or storage hopper for the materials is of much greater volume, and cross sectional area than the cross sectional area of the conveying pneumatic conduit. Also, many means are used for the introduction of these materials from the storage hopper into the pneumatic system. Frequency these products or goods are of the same nature or are of a uniform size and thus conventional means or doors may be utilized to introduce the material from a relatively large storage hopper into the pneumatic conduit. However, in a pneumatic system when mixed bulk materials of various sizes and different geometrical configurations are handled together, then particular problems are encountered since it is extremely difficult and almost impossible to secure positive control of the doors.

It is also particularly difficult to feed mixed bulk material from a relatively large feed or storage hopper into a smaller pneumatic conveying tube without clogging either the point of entry or the conveying tube itself. The feeding system of the present invention utilizes doors of a curved configuration operating on a pulsating metered cycle and thereby secures desirable results and greatly improves the operation and efficiency of the entire pneumatic conveying system.

The present invention may be readily understood by reference to the drawings illustrating one embodiment of the same.

FIG. 3 illustrates the doors as they are opening, while

Figure 1:
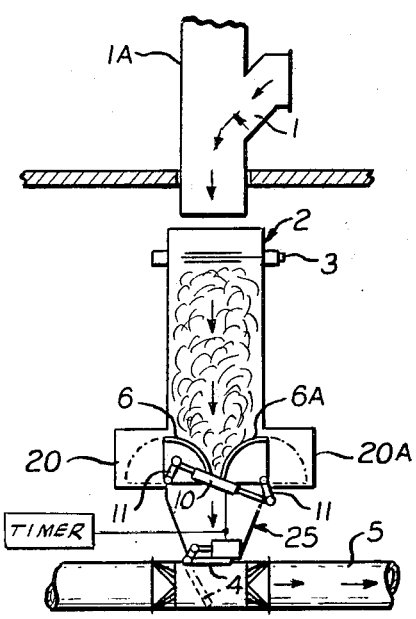
FIG. 1 illustrates an overall embodiment including the feed hopper and the conveying tube or conduit.

Referring specifically to FIG. 1, bulk material is fed from above, through conduits 1 and 1a into a feeding storage hopper, reservoir or holding area 2. Any number of conduits may be used, and the method of feeding into hopper 2 may be any suitable means such as by gravity, by pneumatics, or by mechanical means.

A preferred method of control is to utilize a sensing device 3 positioned near the top of the feed hopper 2 which sensing device will initiate suitable control means to actuate metering doors or gates 6 and 6A when the bulk material in the hopper reaches the height of the sensing device. The operation of the doors may be manual or may be activated to be opened at any height of bulk material, or may be activated to open at set times or at time set intervals.

Figure 2:
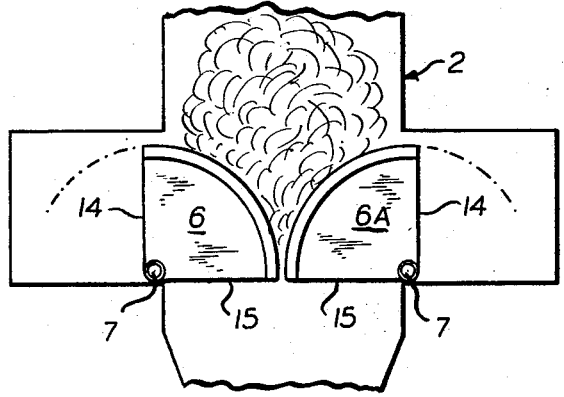
FIG. 2 is an end view of the metering closed doors showing the preferred arc, circular, or segmented cylindrical structure.

The doors or door sections 6 and 6A are of a particular design and configuration. The doors comprise arc-like, or partial cylindrical surfaces oscillating or rotating to the open and closed porition from housings 20 and 20A positioned on opposite sides of the feed hopper 2. In the closed position the adjacent or leading edges of the surfaces of 6 and 6A remain apart about 1 to 6 inches but preferably about 2 to 4 inches, such as about 3 inches (see FIG. 2). This allows space for material caught between the arched doors while the doors are in the closing phase of the cycle thus preventing jamming of these doors.

When the feeding or measuring doors 6 and 6A are activated, line system entry door 4 (see FIG. 4) opens and remains open during the entire activation period. During the activation period doors 6 and 6A open and close at a predetermined rate so as to permit the bulk material to flow in measured increments from feed hopper 2 into intermediate or transitional hopper 25. Only enough bulk material is permitted to enter intermediate hopper 25 in each increment or pulse to insure that clogging will not occur either at the point of entry 26 into conveying duct 5, or in the conveying duct itself.

Feed hopper 2 may be vertically straight in either a square, rectangular, or cylindrical cross sectional shape, but it is preferred that it be tapered in such a manner that the cross sectional area at the top exceeds the cross sectional area at the bottom preferably by about 5 to 30 percent, such as about 15 percent.

Transitional or intermediate hopper 25 is tapered in such a manner that the cross sectional area at the top approximates the cross sectional area of the bottom of feed hopper 2. The cross sectional area of hopper 25 at the bottom approximates the cross sectional area of the point of entry 26, which preferably approximates the cross sectional area of conveying line conduit 5. Preferably conduit 5 has a diameter of about 14 to 30 inches such as about 16 inches and the cross sectional area of hopper 2 is 2 to 7 times as large, such as about 4 times that of the cross sectional area of conduit 5.

Suitable means (not shown) produce a conveying pneumatic conveying stream in conduit 5. One means is to provide an exhaust fan down stream in 5 and to provide suitable perforations 27 for admitting air into transitional hopper 25.

One method of opening doors 6 is to have sensing device 3 energize suitable conventional means so as to have power cylinders 10 rotate levers 11 which are rigidly affixed to shafts 7, thus causing these shafts and doors to rotate.

Figure 3:
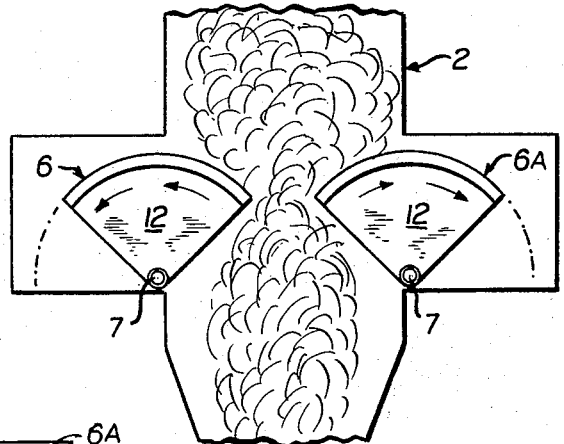

The doors 6 are of a quadrant hollow cylinder configuration preferably having solid end pieces 12 which are rigidly affixed to shafts 7 (see FIG. 3). Solid side flat surfaces or side pieces 14 and 15 are preferably attached to end pieces 12 and to the curved door surfaces and extend the length of the doors. The faces of the doors facing upstream are convex surfaces. Thus when the doors are fully opened and in the housings, surfaces 15 form a continuous smooth portion of the wall of hopper 2 making for easy flow of material downwardly (see FIG. 4) into transitional hopper 25.

The doors in essence comprise a quadrant or more of a cylinder having one curved surface, two flat side surfaces, and two flat end surfaces which flat side surfaces are positioned approximately 90° with respect to each other. The curved surface is attached edgewise to each edge of the respective side surfaces.

Figure 4:
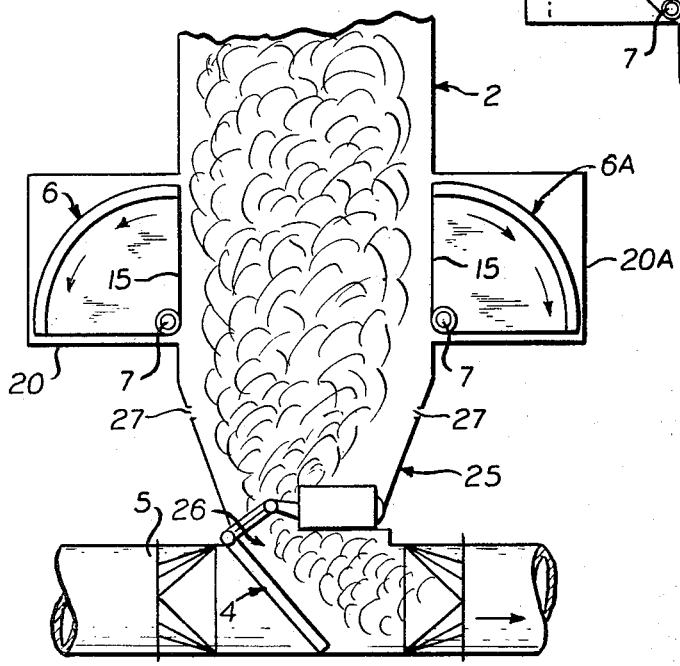
FIG. 4 shows the control doors in the fully open position.

A very desirable mode of operation is shown in FIG. 4 wherein doors 6, 6A are open thus permitting the bulky material to fall into and through the transitional hopper 25. This forces the compacted material to break up as it enters the main conveying tube 5 and eliminates any clogging of the system. The door 4 when open impinges on the bottom of conveying conduit or tube 5 thereby increasing the efficiency of the pneumatic system with respect to moving the bulky material from the hopper 2.

The pneumatic system is similar in general to the system described in Boon's U.S. Pat. Nos. 2,556,058, granted June 5, 1951; 3,208,800, Sept. 28, 1965; 3,301,603, Jan. 31, 1967; and 3,524,681, Aug. 18, 1970.

While the curvature of the surfaces of the doors facing upstream may be varied somewhat, it is preferred that the cross sectional configurations be arcs of circles, the arcs preferably being of lengths about one quarter of the circumference of the circle.

It is to be understood that the length of the activation period, during which door 4 remains open, may vary widely depending upon a number of factors, such as type of mixed bulk material, size of storage hopper 2, size and type of equipment, and the like. For example, activation periods may vary from one-half to several minutes or more, such as about 1 to 2 minutes. The number of pulsations of the metering doors 6, 6A and the length of these pulses will also vary as a function of the above enumerated condition. These pulses or openings and closings may, for example, vary from 5 to 20 per activation period. In general, these pulses are designed to supply the bulk material in increments to the transitional hopper to the conveying duct.

The means to open door 4 at the start of the activation period, keep it open during the activation period and to close it at the end of the activation period may be any conventional adjustable clock timing device assembly or other timing device. Sensing element 3 may comprise an electrical type pick up which will initiate start up of a clock which will function to operate cylinders and levers to open door 4, and at the end of a predetermined activation period function in reverse to close door 4. The pulsing or opening and closing of doors 6, 6A during the activation period may be controlled in a similar manner using a second timing clock or the same clock wired in a manner to secure the desired number of pulses and the lengths of the pulses during the activation period.

As pointed out heretofore, by the present system it is possible to improve the overall efficiency and operation of a pneumatic conveying system particularly when handling solid but bulky material.

The embodiments of the invention in which an exclusive property or privilege is claimed are defined as follows:

1. An improved mixed bulk pneumatic conveying system which comprises in combination a feed hopper having a relatively large cross sectional area, a pneumatic conveying conduit having a relatively small cross sectional area, means for securing a conveying flow of air through said conduit, a transitional hopper intermediate said feed hopper and said conduit, a conduit port of entry between said conduit and said transitional hopper intermediate said feed hopper characterized by having a cross sectional area at its top substantially equal to the cross sectional area of the bottom of said feed hopper and having a cross sectional area at its bottom substantially equal to the cross sectional area of the bottom of said feed hopper and having a cross sectional area at its bottom substantially equal to the cross sectional area of said conduit port, feed hopper doors between said feed hopper and said transitional hopper, a conduit port door between said transitional hopper and said conduit, means for opening said closing said conduit port door, means for opening and closing said feed hopper doors, and timing means to coordinate the operation of said conduit port door and said feed hopper doors whereby the feed hopper doors are opened and closed a plurality of times during each period that the conduit port door is in the open position.

2. System as defined by claim 1 wherein said feed hopper doors are characterized by having convex curved surfaces facing upstream.

3. System as defined by claim 2 wherein said feed hopper doors are quadrants of cylindrical elements.

4. System as defined by claim 3 wherein said conduit port door when open substantially seals off said conveying conduit upstream of said conduit port.

5. System as defined by claim 4 wherein said transitional hopper is partially perforated, thereby permitting the flow of air into the system and also functioning to string out the down falling compacted material.

6. System as defined by claim 1 wherein the cross sectional area of said feed hopper is about 3 to 7 times the cross sectional area of said conveying conduit.

7. System as defined by claim 6 wherein the diameter of said conveying conduit is about 14 to 30 inches.

8. System as defined by claim 1 wherein said feed hopper doors when closed are characterized by the adjacent and leading edges of said doors being spaced apart.

9. System as defined by claim 8 wherein the leading edges of said doors are spaced apart from about 2 to 4 inches.

10. System as defined by claim 1 wherein said feed hopper doors when open seat into housing areas exterior to said feed hopper, said housing areas being only in communication with said feed hopper.

11. A pneumatic conveying system which comprises in combination a pneumatic conveying conduit, suitable means for securing a flow of conveying air through said conduit, a feed hopper in communication with said conduit through a port in said conduit, feed hopper doors positioned in said feed hopper a conduit port door positioned below said feed hopper doors to control entry of material into said conduit through said port, said feed hopper doors characterized by having upwardly curved surfaces, and being further characterized that in the closed position the adjacent and leading edges of said doors are spaced apart, means for opening and closing said conduit port door, means for opening and closing said feed hopper doors, and timing means to coordinate the operation of said conduit port door and said feed hopper doors whereby the feed hopper doors are opened and closed a plurality of times during each period that the conduit port door is in the open position.

12. System as defined by claim 11 wherein the leading edges of said doors are spaced apart from about 1 to 6 inches.

13. System as defined by claim 12 wherein the leading edges of said doors are spaced apart from about 2 to 4 inches.

14. System as defined by claim 11 wherein said feed hopper doors are quadrants of a cylindrical element.

15. System as defined by claim 14 wherein said feed hopper doors comprise two sections diametrically opposed, each section mounted on a rotatable shaft at the bottom of said feed hopper, which shafts are activated by suitable sensing means to rotate said feed hopper doors thereby opening and closing said feed hopper doors.

16. System as defined by claim 15 wherein said sensing means actuates said shafts by causing pistons to move levers mounted on said shafts.

17. System as defined by claim 15 wherein said suitable sensing means is a sensing device positioned near the top of said hopper which sensing device actuates said shafts when material within said feed hopper reaches the height of said sensing device.

18. System as defined by claim 17 for bulky material wherein a conduit port door is positioned below said feed hopper doors, said conduit port door being actuated by said sensing device to open when said feed hopper doors open whereby to increase the efficiency of the system.

19. System as defined by claim 18 wherein said curved feed hopper doors are convex facing upstream and wherein said conduit port door is characterized when open to substantially prohibit communication upstream in said conduit beyond the point of entry from said hopper.

20. System as defined by claim 11 wherein said feed hopper doors when open rotate into housing areas exterior to said feed hopper, said housing areas being only in communication with said feed hopper.

* * * * *